United States Patent [19]
Elliott

[11] 3,746,027
[45] July 17, 1973

[54] PUMP STATION
[75] Inventor: Robert E. Elliott, Tulsa, Okla.
[73] Assignee: FWI, Inc., Tulsa, Okla.
[22] Filed: Oct. 4, 1971
[21] Appl. No.: 186,245

[52] U.S. Cl................ 137/1, 137/268, 137/569,
   137/624.18
[51] Int. Cl..................... B08b 9/04, F04b 23/00
[58] Field of Search................ 137/110, 268, 569,
   137/624.18, 1; 251/58, 62

[56] References Cited
UNITED STATES PATENTS
| | | | |
|---|---|---|---|
| 1,904,320 | 4/1933 | Marples | 137/569 |
| 3,062,232 | 11/1962 | McGay | 251/58 X |
| 3,177,894 | 4/1965 | Camp | 137/527 X |
| 3,212,116 | 10/1965 | Gentry, Jr. | 137/268 X |

*Primary Examiner*—Martin P. Schwadron
*Attorney*—Head & Johnson

[57] ABSTRACT

Method and apparatus for a pipeline station including a power-assisted check valve in the pipeline, a bypass line around the check valve, a motor-driven pump in the bypass line and a power-operated valve in the bypass line in series with and downstream of the pump, including means, when it is desired to start the pump, of first applying a closing force on the check valve to move it towards the closed position, starting the pump, and opening the bypass valve, the steps being conducted in time-spaced sequence.

7 Claims, 1 Drawing Figure

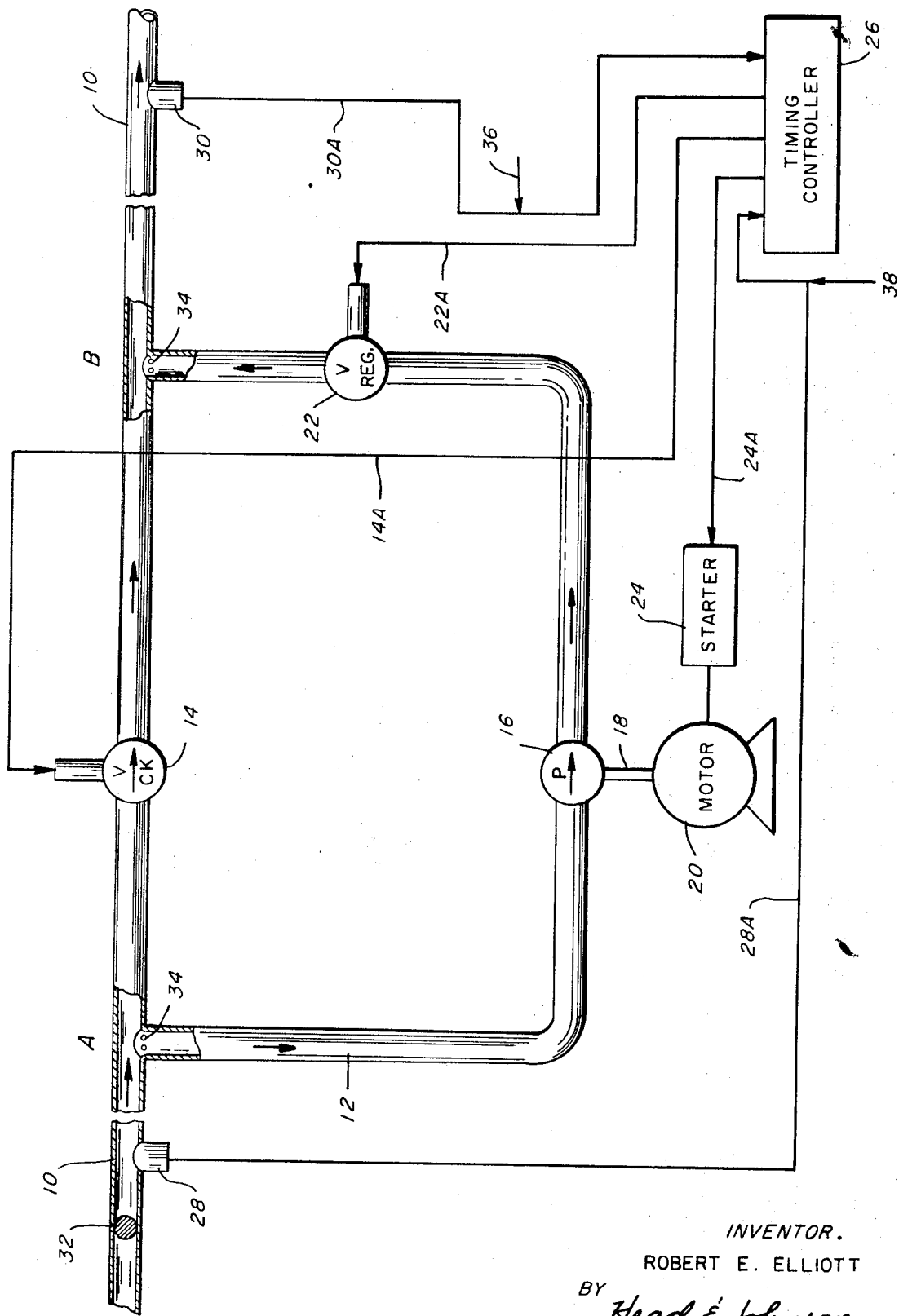

PUMP STATION

BACKGROUNDS, SUMMARY AND OBJECT OF THE INVENTION

Most crude oil, as well as much refined products, moves from production areas to consumption areas through pipeline systems. Most pipeline systems require a series of pump stations, at each of which the pressure of the fluid is increased by one or more pumps so as to overcome flow-resistance, differences of elevation, and the fluid passed on to the next pump station. Typically, a pipeline pump station consists of a check valve in the pipeline, a bypass line around the valve, one or more pumps positioned in the bypass line and a bypass valve in series with the pump(s). (s). The valve in the main pipeline is typically a check valve which is closed when the pump station is in operation and which is opened when the pump station is not in operation. The bypass valve in series with the pump in the bypass line is opened when the station is in operation and closed when not in operation. Most pipeline systems are designed so that any one pipeline station may be idle (as when struck by lightning) yet the pipeline system will continue to function utilizing the pumping facilities of the other pump stations. It is necessary that pipeline systems be designed so as to permit a station to be taken out of operation such as for any repair, or modification.

In modern pipeline techniques, the use of the pipeline pigs is frequently employed, the pigs having several purposes. For example, pigs are passed through pipelines in order to sweep debris, water, dirt, or heavier fluid components which tend to settle in lower portions of the line. If such condensates are not removed they may freeze during cold weather and cause blockage of the line, or reduced flow capacity.

A second purpose for using pigs is to clean the inside of pipelines. For such purposes the pigs are usually equipped with brushes or other abrading means for dislodging any material or scale which has adherred to the interior of the pipeline and which might otherwise accumulate and retard or obstruct flow through the line.

A third basic use of pipeline pigs is as a separator between products. As an example, a pipeline may be used during part of the time for the transportation of fuel oil and during another time for the transportation of gasoline. When transition is made from one product to another, a pig, which may be in the form of a sphere, is inserted at the end of one product and at the beginning of another so as to reduce mutual intermixing and the contamination of each product. These are only some of the reasons for utilizing pigs or shperes in modern pipeline operations.

When a pig is being passed through a pipeline, each pump station upon pig arrival must be stopped and restarted since obviously a pig cannot pass through a pump. For this reason at each station the pump must be stopped and the check valve at the pipeline station permits the passage of the pig therethrough. After the pig has passed by each station, pump must be restarted to resume pumping and to raise the pressure of the pipeline system sufficient to permit the subsequent station to be stopped while the pig passes it. Due to the use of pipeline pigs, as well as for normal repair and maintence procedures, it is therefore necessary to frequently start and stop pump stations in pipeline systems. Local failure of electric power may sometimes also cause stoppage, followed by a restarting sequence.

As previously indicated, a typical pipeline station includes a pump in parallel with a check valve in the main pipeline. When the pump is stopped for any reason the check valve acutomatically opens allowing the fluid in the pipeline to flow directly through it and on to the next station. When the pump starts, the pressure on the downstream side of the check valve is increased compared to the upstream side of the check valve, causing the check valve to close. If this occurs rapidly, this pressure change can cause the check valve to slam closed. While slamming can be contended with in small check valve sizes, the problem becomes more severe as the size of the valve increases. With large size check valves, violent slamming can be extremely damaging. The clapper of a check valve of the size utilized in a large pipeline, of, for instance, 36 inches in diameter, typically weighs hundreds of pounds. When this clapper is quickly moved from the opened to the enclosed position, the hydraulic pressure bhind it can cause tremendous hammering on the valve seat, shortening the life of the valve seat and, in addition, such violent closing causes high momentary hydraulic shock pressure to be generated giving rise to the possibility of rupture of pipeline components, and machinery.

Another problem to be considered in starting centrifugal pumps in pipeline pump stations is the starting torque requirements imposed by the pump and inertia of associated liquid. Ideally, a pump should be started and stopped at zero flow rate for minimum torque requirement. When a centrifugal pump is started under open flow, the electric current demanded for accelerating pump and associated fluid is high. This imposes a high, short-term surge on electrical equipment which causes undesirable voltage reductions in the power system which may interfere with the operation of other electrical components.

Another serious problem occurs when stopping a pump operating under high flow rate and high horsepower. When the motor starter contacts open with the motor operating under full load and amperage, the opening contacts have a great tendency to arc. The life of starter contacts is related to the amount of heavy arcing which takes place when the loaded motor is disconnected and the amount of arcing is proportional to the load on the current flowing through the motor at the instant of disconnect. Thus, if the fluid flow rate and motor torque can be reduced prior to stopping, arcing of the starter contacts and voltage disturbance is correspondingly minimized.

It is therefore a general object of this invention to provide a pipeline station, and means of operating a pipeline station, in which the electric surges, strains, stresses and wear upon equipment during starting and stopping operations are greatly reduced.

Another object of this invention is to provide a pipeline station, and a method of operating a pipeline station having a check valve, in which the cooperative opening and the closing of the check valve is assisted by power in such a way as to reduce the pressure-drop across the valve when it is opened, to facilitate pigging operations, and to reduce slamming of the valve clapper when being closed.

Another object of this invention is to provide a pipeline station, and a sequential method of operating a pipeline station having a motor-driven centrifugal pump, in which the torque requirements of the pump are reduced prior to starting or to stopping of the pump.

These general objects, as well as more specific objects of the invention, will be understood from the following description and claims, taken in conjunction with the drawings.

DESCRIPTION OF VIEW

The drawing is a schematic diagram of a pump station incorporating the elements and method of this invention.

DETAILED DESCRIPTION

Referring to the drawing a pipeline station utilizing the apparatus and methods of this invention is shown in schematic arrangement. Pipeline 10 is of a type utilized to transport fluids, such as crude oil, refined petroleum products, water, or the like. Pipeline 10 may be, and will typically be, of a length requiring a plurality of pump stations only one of which is shown in the drawing. Pipeline 10 may be of a variety of sizes, however, the larger the diameter of pipeline 10, the more relevant and important become the principles of this invention.

The pipeline station includes a bypass line 12 which bypasses a power-assisted check valve 14. The power-assisted check valve 14 may be of the type such as generally disclosed in U.S. Pat. No. 3,177,894. In this patent, the check valve has a hydraulic cylinder utilized to decrease the rate of opening and closing of the valve. However, in practicing the present invention, the check valve of the type shown in U.S. Pat. No. 3,177,894 would be modified to include hydraulic or pneumatic means for applying pressure to the ports of the cylinder for moving the valve clapper towards the open or towards the closed position, as required.

Fluid moves through the pipeline 10 and check valve 14 in the direction indicated by the arrows. Station bypass line 12 intersects pipeline 10 at a point upstream of check valve 14, designated by the letter A, and at a point downstream of check valve 14, designated by the letter B.

Positioned in bypass line 12 is one or more centrifugal pumps 16 driven by one or more shafts 18, and one or more motors 20. When motor 20 is energized, fluid moves through pump 16 in the direction indicated by the arrow.

In series with pump 16 in bypass line 12, between the pump and the downstream point B, is a power-actuated bypass valve 22. Valve 22 is typically a gate valve having a motor-driven screw thread means of opening and closing the gate.

Motor 20 is started ans stopped by means of a motor starter 24. Check valve 14, bypass valve 22, and starter 24 are all connected to and controlled by a timer-controller 26. For this purpose, conductors 14A, 22A, and 24A respectively extend from the controlled components to the timer-controller 26.

As previously indicated, a common practice in modern pipeline operations is the utilization of pigs. To assist in the automatic operation of the pipeline station, an upstream pig detector 28 is positioned in line 10, upstream of point A, and connected to timer-controller 26 by means of conductor 28A. The spacing between the upstream pig detector 28 and point A is of sufficient distance to signal the station in advance of the arrival of pig to allow the station to prepare for its passage. For this reason, the distance between the upstream pig detector 28 and point A of the station may typically be several hundred feet or more.

Positioned in the pipeline 10 downstream of the station is a downstream pig detector 30 which is used to signal that a departing pig has completed passage past the station. A pig 32 is shown in pipeline 10 approaching the station.

OPERATION BY PRESENT PRACTICES

Assume the station is operating in normal running condition in which motor 20 in energized driving pump 16. This means that bypass valve 22 is open. Due to the increased pressure applied by pump 16, the pressure in the pipeline system at point B will exceed than at point A. This means that check valve 14 is closed and all fluid flowing through pipeline 10 flows through station bypass 12. Check valve 14 typically, in present practice, does not usually include any power means to aid in opening or closing the clapper. Assume that it is desired to stop pump 16 for instance, to permit the passage of pig 32 past the station. Obviously pig 32 cannot pass through pump 12, and to insure that pig 32 does not enter bypass line 12 jail bars 34, or other means, are provided at the intersection of the bypass line 12 with the pipeline at both points A and B.

To permit passage of pig 32, or to shut down the station for any reason, check valve 14 must open. In the presently practiced method the usual prodedure is to close bypass valve 22 terminating flow through loop 12 and concurrently opening check valve 14. Power to motor is then disconnected and pump is idled. All fluid now flows through the pipeline and none through bypass 12. Flow through check valve 14 causes the clapper to open, at least partially. When pig 32 passes through check valve 14 the clapper must then be fully opened. Pig passage depends upon pig velocity and Kinetic energy or upon the fluid pressure at point A being sufficient to force the pig 32 to open fully the clapper of check valve 14 while passing therethrough. After the passage of the pig, the usual current practice is to start the pump 16, followed by opening valve 22. When valve 22 becomes partially open, it allows full pump discharge pressure to suddenly reach point B. When pump discharge pressure reaches point B, two things occur. First, some fluid is discharged downstream away from the station. Second, the fluid located in the line between point B and check valve 14 must be decelerated, halted, and forced to reverse its direction. This reversal of flow must occur to cause an unassisted check to close. Violent slamming then occurs, usually.

OPERATION BY PRACTICES OF THIS INVENTION

The method of operation of the pump station according to this invention will now be described. As arriving pig 32 passes detector 28, a signal is transmitted by conductor 28A to timer-controller 26. The timer-controller functions to control the elements of the pump station in a timed sequence. Timer-controller 26 may be of a variety of configurations well known in the art and therefore is not disclosed in detail herein. For instance, timer-controller 26 may be of the type including a small motor-gear reducer driving a series of cams which operates switches, the cams being configured to open and close the switches in the desired time-sequence. Another arrangement would include the use of time delay relays. Solid state time delay circuits may likewise be employed. In any event, upon receipt of a signal from conductor 28A timer-controller 28 starts its sequence.

Upon receipt of signal from conductor 28A, indicating that pig 32 is approaching the station, time-controller 26 begins its sequence by stopping pump 16 and opening check valve 14 to facilitate the passage of the pig. The first signal from timer-controller 26 is on conductor 14A to urge check valve 14 toward the open position. At this juncture check valve 14 is fully closed and the signal on conductor 14A causes hydraulic or pneumatic pressure to be exerted under a piston tending to open the check valve. Such hydraulic or pneumatic pressure is normally not sufficient to force check valve 14 to open against existing pump pressure differential across the clapper, as long as pressure at point B exceeds that at point A. However, the opening signal at 14A insures that clapper of valve 14 will open at the earliest moment when the pressure at point B nearly equals that at point A.

The second signal from timer-controller 26 is by way of conductor 22A to initiate closure of bypass valve 22. As the valve 22 begins to close, fluid flow through pump 16 and loop 12 begins to decrease. At the same time, the pressure at point B in the pipeline relative to point A begins to decrease. When it reaches or nearly approaches the pressure of point A, the clapper of valve 14 begins to open. As bypass valve 22 approaches closing condition, the torque required by pump 16 is dropping to the minimum running condition. This is often called "shut-in" pumping condition. At such time, timer-controller 26, by way of conductor 24A, signals the opening of starter 24, stopping the motor. This means that starter 24 has disconnected motor 20 under minimum pump load conditions, causing minimum current arcing of the starter contacts. The signal applied by conductor 14A continues to assist, raising the clapper of valve 14 to its fully opened position. As the pig 32 enters valve 14, no additional hydraulic force or inertia is required to raise the clapper from partially to fully open. This means that the pig 32 passes freely through check valve 14 without restriction. In addition, with the clapper of valve 14 held fully open, minimum fluid pressure-drop across valve 14 is thus imposed on the pipeline system.

If the station is to remain idled, as by reason of a repair, the fact that the clapper in valve 14 is now held completely open results in lowest pressure-drop and hence lessened pumping load on the other stations and concurrent reduction of overall pumping costs.

Or, if stopped briefly to pass a pig, the following sequence continues: As pig 32 passes the downstream pig detector 30, a signal is applied by conductor 30A to the timer-controller to begin the sequence of restarting pump 16.

The first event in restarting pump 16 is a signal on conductor 14A to begin closing check valve 14. This signal initiates a hydraulic or pneumatic pressure on a piston forcing the check valve 14 towards the closed position. In the preferred arrangement, the pressure applied against the piston of the check valve 14 is insufficient to cause the clapper to close against the pressure of fluid flowing through the valve. But, it is sufficient to bias the valve clapper toward the closed position.

The suction of pump 16 is promptly subjected to the differential pressure of the partially closed check valve 14. The bias toward closure, existing in check valve 14 during the acceleration of the pump, assists and eases the starting of the pump and motor because the differential pressure so created raises the static fluid pressure at the pump inlet and tends to divert and accelerate fluid into pipe 12, toward the pump inlet. Centrifugal pumps require minimum starting torque under no-flow conditions, i.e. when shut-in. With bypass valve 22 closed, the pump will accelerate quickly with minimum torque requirement, thereby needing minimum electrical amperage increment for acceleration.

After the application of closure bias on check valve 14 has been provided, the next step, after suitable time has elapsed, is the application of a signal by way of conductor 24A to starter 24 to start motor 20 and thereby pump 16. At this time, the discharge of pump 16 is still blocked by valve 22.

After signal 24 is applied to motor 20 to start pump 16, followed by sufficient time to allow them to reach full running speed, a signal is applied by conductor 22A to bypass valve 22, causing it to start to open. As it slowly opens, the rate of fluid flow through pump 16 gradually increases loading the pump and motor.

As valve 22 opens, the existing pump discharge pressure passes through it and pressure at point B begins to build relative to that at point A. Since a closing force was earlier applied to the clapper of valve 14, the advent of higher pressure at point B, exceeding that at point A, allows the check valve 14 to close promptly and completely. All fluid flow then diverts into bypass line 12 and through the pump circuit.

Clapper slamming is eliminated because, being urged to close by powered means, clapper closing occurs just as soon as liquid circulation is established through line 12 — and without delay. This is in sharp contrast to conventional systems in which a reversal of flow through the check valve must first occur.

Thus, by the timed sequence of events, pump 16 may be started and loaded with high applied suction pressure and check valve 14 is closed punctually with no slam, and no hesitation.

The time intervals of the method outlined depend upon the size, flow rates, and characteristics of the components. In some instances the time interval will be as short as one second or less while in the other instances the time interval may be several seconds. The time intervals between sequential events are particularly governed by the rates of opening and closing of bypass valve 22, and by the time needed to accelerate the pump and liquid leading into it.

It can be seen that the pump station and the method of operation thereof fulfills the objects set forth at the beginning of the specifications. The invention describes apparatus and a method for starting and stopping a pump under minimum load conditions and for opening and closing a check valve, in one instance, to provide minimum restriction of liquid flow and passage of pigs through the valve, and in another instance, to prevent slamming of the check valve after a fluid flow reversal, due to tardy clapper response.

While the invention has been described with a certain degree of particularity it is manifest that changes may be made in the details of the components and methods of the invention without departing from the spirit and scope of this disclosure. It is understood that the invention is not to be limited by the exemplified embodiment set forth herein, but is to limited only by the scope of the attached claim or claims, including the full range of equivalency to which each element or step thereof is entitled.

What is claimed:

1. A pump station comprising:
   a fluid conducting pipeline;
   a power-assisted check valve in said pipeline;
   a bypass line having a first connection to said pipeline upstream of said check valve and a second connection to said pipeline downstream of said valve;
   one or more motor-driven centrifugal pumps in said bypass line;
   a starter controlling the starting and stopping of each said motor-driven centrifugal pump;
   a power-actuated bypass valve in said bypass line between said pump and the downstream connection with said pipeline;
   and a timer-controller having connection to said power-assisted check valve, said starter and said power-actuated bypass valve, the timer-controller including means for the timed sequential actuation of said power-assisted check valve in advance of the actuation of said starter, and the actuation of said power-actuated bypass valve in timed sequential relation for starting and stopping said pump under minimum load conditions and eliminating slamming of said check valve.

2. A pump station according to claim 1 including:
   an incoming pig detector affixed to said pipeline upstream of said check valve having connection to said timer-controller for automatic actuation of said timer-controller to stop said pump and open said check valve when the arrival of a pig is detected.

3. A pump station according to claim 2 including:
   a pig detector affixed to said pipeline downstream of said check valve having connection to said timer-controller for the automatic actuation of said timer-controller to start said pump, and close said check valve when the departure of the pig is detected.

4. A pump station according to claim 1 wherein said timer-controller includes means, upon receipt of a pump start signal of: first, actuating said power-assisted check valve towards the closed position, second, actuating said starter to start said pump, and third, cause said bypass valve to open, all in time-spaced relationships.

5. A pump station according to claim 1 wherein said timer-controller includes means, upon receipt of a pump stop signal of: first, actuating said check valve towards the open position, second, cause said bypass valve to close, and third, actuating said starter to stop said pump, all in time-spaced relationships.

6. In a pipeline station having a power-assisted check valve in the pipeline, a bypass line around the check valve, a motor-driven pump in the bypass line, and a power-operated bypass valve in the bypass line in series with and downstream of the pump, a method of operating the pipeline station to start the pump in a manner to impose least power requirements on the pump and to eliminate slamming of the check valve, comprising the steps of:
   first, applying closing force on said check valve to move it towards the closed position;
   second, starting the motor-driven pump; and
   third, opening the bypass valve, the steps being conducted in time-spaced sequence.

7. In a pipeline station having a power-assisted check valve in the pipeline, a bypass line around the check valve, a motor-driven pump in the bypass line, and a power-operated bypass valve in the bypass line in series with and downstream of the pump, a method of operating the pipeline station to stop the pump under minimum load conditions, comprising the steps of:
   first, applying opening force on said check valve to move it towards the open position;
   second, closing the bypass valve; and
   third, stopping the motor-driven pump, the steps being conducted in time-spaced sequence.

* * * * *